(12) United States Patent
Back et al.

(10) Patent No.: US 11,645,036 B2
(45) Date of Patent: May 9, 2023

(54) ELECTRONIC DEVICE AND OPERATING METHOD FOR PROVIDING FEEDBACK INFORMATION IN RESPONSE TO USER INPUT

(71) Applicant: SAMSUNG ELECTRONICS CO., LTD., Suwon-si (KR)

(72) Inventors: Seohyun Back, Suwon-si (KR); Seunghak Yu, Suwon-si (KR); Huiwon Yun, Suwon-si (KR); Hojin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 16/718,672

(22) Filed: Dec. 18, 2019

(65) Prior Publication Data

US 2020/0233639 A1 Jul. 23, 2020

(30) Foreign Application Priority Data

Jan. 23, 2019 (KR) .................. 10-2019-0008608

(51) Int. Cl.
*G06F 3/16* (2006.01)
*G06N 3/04* (2023.01)
*G06N 3/08* (2023.01)

(52) U.S. Cl.
CPC .............. *G06F 3/167* (2013.01); *G06N 3/04* (2013.01); *G06N 3/08* (2013.01)

(58) Field of Classification Search
CPC ............. G06F 3/167; G06N 3/04; G06N 3/08
See application file for complete search history.

(56) References Cited

U.S. PATENT DOCUMENTS

| 7,548,859 B2 | 6/2009 | Thompson et al. |
| 10,762,892 B2* | 9/2020 | Rusak ...................... G10L 15/22 |
| 2008/0091406 A1* | 4/2008 | Baldwin ................. G10L 15/22 |
| | | 704/4 |

(Continued)

FOREIGN PATENT DOCUMENTS

| AU | 2014214676 A1 * | 8/2015 | ............. G06F 3/167 |
| AU | 2014251347 A1 * | 9/2015 | ........... G06F 3/0484 |

(Continued)

OTHER PUBLICATIONS

Communication pursuant to Article 94(3) EPC dated Sep. 24, 2020 in counterpart European Patent Application No. 20150327.3.

(Continued)

*Primary Examiner* — Mohammad K Islam
(74) *Attorney, Agent, or Firm* — Nixon & Vanderhye P.C.

(57) ABSTRACT

Provided are an artificial intelligence (AI) system that mimics cognitive functions, such as recognition and determination, of the human brain using a machine learning algorithm such as deep learning and an application thereof. A method of providing feedback information in response to a user input including determining a user's intention, determining a variation in a number of candidates for an operation to be determined to correspond to the intention based on information input by the user, generating feedback information based on the determined variation, and providing the generated feedback information to the user is provided.

7 Claims, 8 Drawing Sheets

(56) References Cited

U.S. PATENT DOCUMENTS

| | | | |
|---|---|---|---|
| 2011/0301943 A1* | 12/2011 | Patch | G06F 3/167 |
| | | | 704/9 |
| 2012/0156660 A1 | 6/2012 | Kwon et al. | |
| 2012/0265528 A1 | 10/2012 | Gruber et al. | |
| 2013/0283168 A1* | 10/2013 | Brown | G06F 3/165 |
| | | | 715/728 |
| 2014/0316764 A1 | 10/2014 | Ayan et al. | |
| 2015/0179168 A1 | 6/2015 | Hakkani-Tur et al. | |
| 2017/0212884 A1 | 7/2017 | Kim et al. | |
| 2018/0012601 A1 | 1/2018 | Kumar et al. | |
| 2018/0232376 A1 | 8/2018 | Zhu et al. | |

FOREIGN PATENT DOCUMENTS

| | | | | |
|---|---|---|---|---|
| AU | 2014278592 A1 * | 12/2015 | | G06F 16/3344 |
| CA | 3000109 A1 * | 7/2011 | | B60K 35/00 |
| CN | 110720098 A * | 1/2020 | | G06F 16/90332 |
| EP | 3 144 931 | 3/2017 | | |
| JP | 2004-045900 | 2/2004 | | |
| KR | 10-1522837 | 5/2015 | | |
| WO | WO-2017213680 A1 * | 12/2017 | | G06F 16/3344 |
| WO | WO-2020114599 A1 * | 6/2020 | | G06F 3/04883 |

OTHER PUBLICATIONS

Extended European Search Report and Written Opinion dated Apr. 9, 2020 in counterpart European Patent Application No. 20150327.3.

* cited by examiner

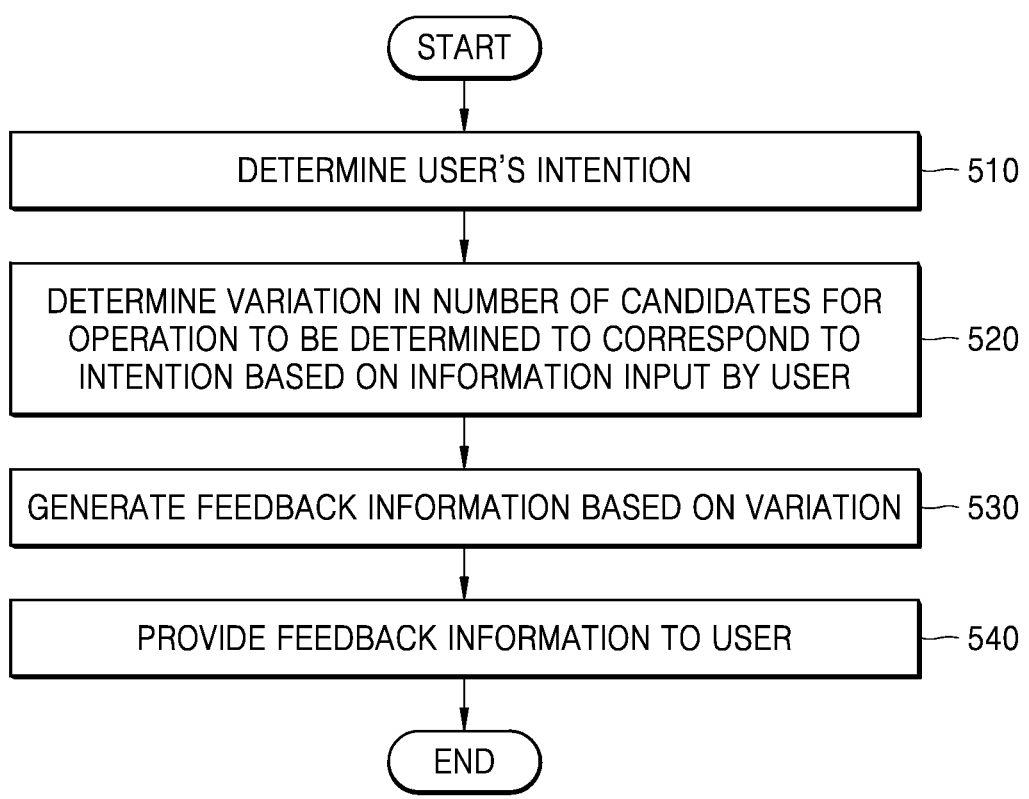

FIG. 6

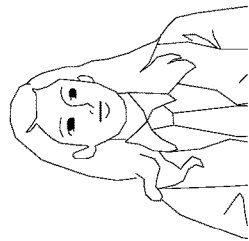
110

610 NEED TO BUY BEEF, ABOUT 300 G, FOR SEAWEED SOUP, HMM...

640 AH, FOR SOUP, FOR ONE SERVING, HMM...

660 AH! OK...

680 AH! ABOUT 15,000 WON, DOMESTIC PRODUCT

670 THE PRICE IS IN THE RANGE OF 9,000 WON TO 21,000 WON. WHICH PRICE DO YOU WANT?

690 ORDERING ONLINE AT MART A FOR BEEF FOR SOUP, 300 G, AT PRICE OF 14,000 WON, DELIVERED AT 5:00 PM TO 7:00 PM IS AVAILABLE. DO YOU WANT TO ORDER?

120

620 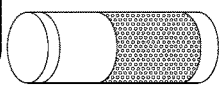
-> INTENTION: PURCHASE OF BEEF
-> SLOT INFORMATION (TYPE OF MEAT, PART OF MEAT, WEIGHT, MANUFACTURER, PRICE, COUNTRY OF ORIGIN)
-> SECOND INFORMATION: BEEF, 300 G, SEAWEED SOUP
-> THIRD INFORMATION: (BEEF, FOR SOUP, 300g, _, _, _)

630 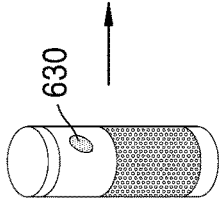
-> SECOND INFORMATION: FOR SOUP, FOR ONE SERVING
-> THIRD INFORMATION: (BEEF, FOR SOUP, 300g, _, _, _)

650 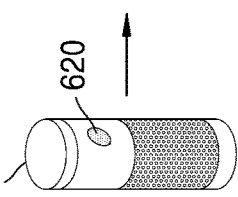
-> SECOND INFORMATION: 15,000 WON, DOMESTIC
-> THIRD INFORMATION: (BEEF, FOR SOUP, 300 G, ABOUT 15,000 WON, DOMESTIC)

ELECTRONIC DEVICE AND OPERATING METHOD FOR PROVIDING FEEDBACK INFORMATION IN RESPONSE TO USER INPUT

CROSS-REFERENCE TO RELATED APPLICATION

This application is based on and claims priority under 35 U.S.C. § 119 to Korean Patent Application No. 10-2019-0008608, filed on Jan. 23, 2019, in the Korean Intellectual Property Office, the disclosure of which is incorporated by reference herein in its entirety.

BACKGROUND

1. Field

The disclosure relates to an electronic device and an operating method thereof for providing feedback information in response to a user input. The disclosure also relates to an artificial intelligence (AI) system utilizing a machine learning algorithm such as deep learning and an application thereof.

2. Description of Related Art

Artificial Intelligence (AI) systems refer to computer systems that mimic human-level intelligence. Unlike a rule-based smart system according to the related art, an AI system is configured to be smarter by training itself and making determinations spontaneously. The more an AI system is used, the higher the recognition rate thereof is obtained, resulting in improvement in accuracy of understanding user preference. Thus, rule-based smart systems according to the related art have been gradually replaced with deep learning-based AI systems.

AI technology may include machine learning (e.g., deep learning) and elementary technology utilizing machine learning.

Machine learning may refer, for example, to algorithm technology that self-classifies/learns characteristics of input data, and element technology is technology that mimics cognitive functions, such as recognition and determination, of the human brain using a machine learning algorithm such as deep learning, and includes technical fields such as linguistic understanding, visual understanding, inference/prediction, knowledge expression, operation control, and the like.

AI technology is applied to various fields as follows. Linguistic understanding may refer, for example, to a technique for recognizing and applying/processing human language/characters and includes natural language processing, machine translation, dialogue system, question and answering, speech recognition/synthesis, and the like. Visual understanding may refer, for example, to a technique for recognizing and processing objects like as done in human vision, and includes object recognition, object tracking, image search, human recognition, scene understanding, spatial understanding, image enhancement, and the like. Inference/prediction may refer, for example, to a technique for determining information and logically inferring and predicting a result, and includes knowledge/probability-based inference, optimization prediction, preference-based planning, recommendation, and the like. Knowledge representation may refer, for example, to a technique for automatically processing human experience information into knowledge data, and includes knowledge building (data generation/classification), knowledge management (data utilization), and the like. Operation control may refer, for example, to a technique for controlling autonomous running of vehicles and motion of robots, and includes motion control (navigation, collision avoidance, and driving), operation control (behavior control), and the like.

The electronic device may provide various responses through a conversation with the user. For example, the electronic device may identify a user's intention through a conversation with the user, perform an operation corresponding to the identified intention, and provide the user with the results. However, when information received from the user is insufficient, it is difficult to determine the operation corresponding to the users intention, thereby making it difficult to provide the operation in accordance with the users intention.

Thus, there is a need to develop a method of guiding a user to sufficiently provide information for determining an operation.

SUMMARY

Embodiments of the disclosure provide an electronic device and an operating method thereof for providing feedback information in response to a user input.

Embodiments of the disclosure may also provide a computer program product including a computer-readable recording medium having recorded thereon a program for executing the operating method in a computer. Technical problems to be addressed are not limited to those mentioned above, and other technical problems may exist.

Additional aspects will be set forth in part in the description which follows and, in part, will be apparent from the description, or may be learned by practice of the presented embodiments of the disclosure.

According to an example embodiment of the disclosure, a method, performed by an electronic device, of providing feedback information in response to an input of a user includes: determining an intention of the user; measuring a variation in a number of candidates for an operation to be determined to correspond to the intention based on information input by the user; generating feedback information based on the measured variation; and providing the feedback information to the user.

According to another example embodiment of the disclosure, an electronic device for providing feedback information in response to an input includes: an inputter comprising input circuitry configured to receive an input; at least one processor configured to control the electronic device to: determine an intention, measure a variation in a number of candidates for an operation to be determined to correspond to the intention based on the input information, and generate feedback information based on the measured variation; and an outputter comprising output circuitry configured to provide the feedback information.

According to another example embodiment of the disclosure, a computer program product including a computer program product comprising a non-transitory computer-readable recording medium having recorded thereon a program for executing operations of the method is provided.

BRIEF DESCRIPTION OF THE DRAWINGS

The above and other aspects, features, and advantages of certain embodiments of the disclosure will be more apparent from the following detailed description, taken in conjunction with the accompanying drawings, in which:

FIG. 5 is a flowchart illustrating an example method of providing feedback information in response to a user input, according to an embodiment of the disclosure;

FIG. 6 is a diagram illustrating an example of providing feedback information in response to a user input, according to an embodiment of the disclosure;

DETAILED DESCRIPTION

Figure 1:
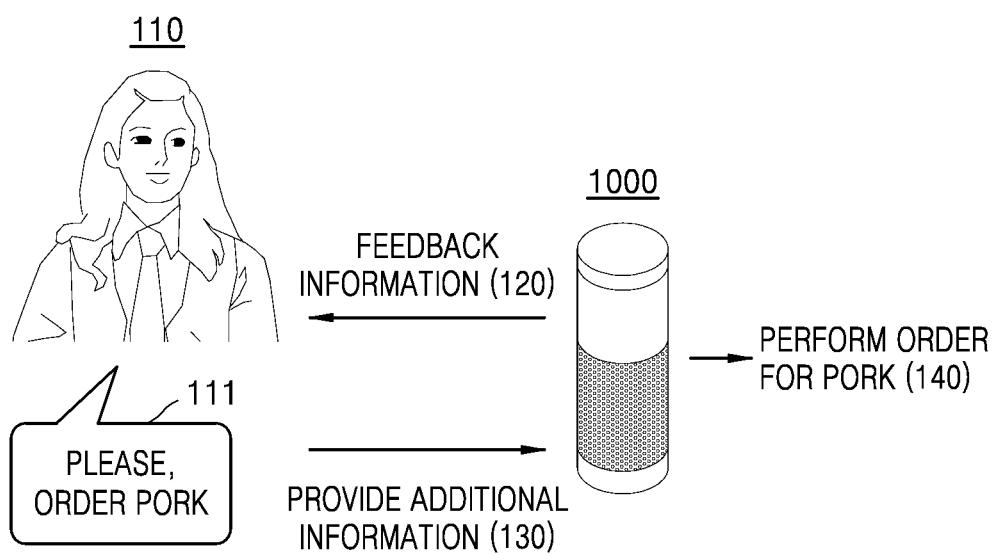
FIG. 1 is a diagram illustrating an example system for providing feedback information in response to a user input, according to an embodiment of the disclosure.

The disclosure will now be described in greater detail with reference to the accompanying drawings. The disclosure may, however, be embodied in many different forms and should not be understood as being limited to the various example embodiments of the disclosure set forth herein. In the drawings, portions unrelated to the descriptions may be omitted for clear description of the disclosure for clarity and the same or similar elements are denoted by the same reference numerals throughout the specification.

Throughout the disclosure, it will also be understood that when an element is referred to as being "connected to" another element, it can be directly connected to the other element, or it can be electrically connected to the other element by having an intervening element interposed therebetween. Also, the term "include" an element does not preclude the other elements but further includes the element unless otherwise stated.

Throughout the disclosure, the expression "at least one of a, b or c" indicates only a, only b, only c, both a and b, both a and c, both b and c, all of a, b, and c, or variations thereof.

Functions related to artificial intelligence according to the disclosure are performed by a processor and a memory. The processor may include one or a plurality of processors. In this regard, the one or a plurality of processors may be a general-purpose processor such as a central processing unit (CPU), an application processor (AP), or a digital signal processor (DSP), a graphics-only processor such as a graphic processing unit (GPU) and a vision processing unit (VPU), or a processor dedicated for artificial intelligence such as a neural processing unit (NPU). The one or a plurality of processors control input data according to operation rules pre-defined and stored in the memory or an artificial intelligence model. In addition, when the one or a plurality of processors is a dedicated processor for artificial intelligence, the dedicated processor for artificial intelligence may be designed in a hardware structure specialized for processing of a specific artificial intelligence model.

The pre-defined operation rules or the artificial intelligence model are created by learning. Here, the "created by learning" indicates that pre-defined operation rules set to perform a desired characteristic (or purpose) or an artificial intelligence model is creased as a basic artificial intelligence model is trained by using a plurality of pieces of training data by a learning algorithm. Such learning may be performed in a device in which the artificial intelligence according to the disclosure is performed or a separate server and/or system. Examples of the learning algorithm may include, but are not limited to, supervised learning, unsupervised learning, semi-supervised learning, or reinforcement learning.

The artificial intelligence model may include a plurality of neural network layers. Each of the plurality of neural network layers has a plurality of weight values and performs neural network computation through calculation between a computation result of a previous layer and each of the plurality of weight values. The plurality of weight values of the plurality of neural network layers may be optimized by learning results of the artificial intelligence model. For example, the plurality of weight values may be refined to reduce or optimize a loss value or a cost value obtained by the artificial intelligence model during learning. An artificial neural network may include a deep neural network, for example, a convolutional neural network (CNN), a recurrent neural network (RNN), a restricted Boltzmann machine (RBM), a deep belief network (DBN), a bidirectional recurrent deep neural network (BRDNN), a deep Q-network, or the like, but is not limited thereto.

Hereinafter, the disclosure will be described in greater detail with reference to the accompanying drawings.

FIG. 1 is a diagram illustrating an example system for providing feedback information in response to a user input according to an embodiment of the disclosure.

Referring to FIG. 1, the system for providing feedback information 120 for an input 111 of a user 110 according to an embodiment of the disclosure may include an electronic device 1000.

The electronic device 1000 may, for example, include a device for providing a response in response to the input 111 of the user 110 and may, for example, and without limitation, include an artificial intelligence speaker device equipped with a speech control function and performing an operation in accordance with a user input.

The electronic device 1000 according to an embodiment of the disclosure may be implemented in various forms. For example, the electronic device 1000 described herein may include, but is not limited to, a smart TV, a set top box, a mobile phone, a tablet PC, a digital camera, a laptop computer, a desktop computer, an electronic book (E-book) terminal, a digital broadcasting terminal, a personal digital assistant (PDA), a portable multimedia player (PMP), a navigation system, an MP3 player, a wearable device, or the like. Hereinafter, an AI speaker will be described as an example of the electronic device 1000 for descriptive convenience.

According to an embodiment of the disclosure, the electronic device 1000 may be a device configured to receive the input 111 of the user 110 and provide feedback information in response to the input 111 of the user 110 through a conversational interface. The conversational interface may be an interface for a user configured to receive an input (e.g., speech input or text input) from a user and provide a response to the input from the user. According to an embodiment of the disclosure, the conversational interface may include, for example, and without limitation, a virtual assistant, an AI assistant, or the like, without being limited thereto. The virtual assistant or the AI assistant may refer, for example, to a software agent that processes an operation required by the user and provides a service specialized for the user.

According to an embodiment of the disclosure, the electronic device 1000 may determine a user's intention using an AI model and perform an operation 140 corresponding to the users intention based on information input by the user.

The user's intention may be determined based on information input by the user, but is not limited thereto, and the user's intention may also be determined according to various methods based on various information about the user, such as, for example, and without limitation, information about an environment surrounding the user and information about a history of user's commands.

In regard to the operation corresponding to the user's intention, the detailed content of the operation may be determined based on information input by the user. For example, when the user's intention is an "order for pork", the electronic device 1000 may determine the detailed content of the order such as, for example, and without limitation, a part of pork, a price range, a country of origin, and a place of purchase, based on information input by the user and perform an operation according to the determined content.

The detailed content of the operation may be determined based on information input by the user, but is not limited thereto, and may also be determined using various information such as information about the environment surrounding the user and information about the history of user's commands.

According to an embodiment of the disclosure, the electronic device 1000 may determine the detailed content of the operation based on information input by the user. When the detailed content of the operation is determined, one or more candidates for the operation corresponding to the user's intention may be determined. For example, based on the detailed content of the operation being determined, the number of the candidates for the operation may decrease. However, when the information input by the user is insufficient to determine the detailed content of the operation, the number of candidates for the operation to be determined increases, and thus there is a possibility of performing an operation that does not match the user's intention.

For example, when the user's intention is an "order for pork" and the detailed content of the operation includes "samgyeopsal (pork belly)" and "price range around 10,000 won", the candidates for the operation may be determined according to a result retrieved from a database in which operations that may be performed by the electronic device 1000 are stored based on the detailed content of the operation. For example, operations including both "pork belly" and "price range around 10,000 won" which are the determined detailed content of the operation, e.g., "order for pork belly priced at about 10,000 won, European, Mart A", "order for pork belly priced at about 10,000 won, European, Mart B", and "order for pork belly priced at about 10,000 won, USA, Mart B" may be determined as the candidates for the operation. The electronic device 1000 may determine an operation to be conducted among a smaller number of candidates for the operation by further adding a detailed content of the operation thereto based on the information received from the user.

In the database, information regarding operations that may be performed by the electronic device 1000 according to the collected information may be stored. For example, the number of grams of pork belly that may actually be ordered from the mart A by the electronic device 1000 and order information classified according to the country of origin may be stored in the database. As another example other than an order, when the user's intention is control of another device, control information about devices and functions controllable by the electronic device 1000 may be stored in the database. Thus, the electronic device 1000 may obtain candidates for the operation including a device and a function controllable by the electronic device 1000 based on the search result retrieved from the database.

However, the electronic device 1000 according to an embodiment of the disclosure may guide the user to provide additional information to the electronic device 1000 by providing feedback information about one or more candidates for the operation to be determined to correspond to the user's intention, based on currently collected information before determining an operation from the candidates for the operation.

For example, the electronic device 1000 may determine the feedback information 120 based on a variation in the number of one or more candidates for the operation to be determined to correspond to the user's intention based on the currently collected information. The variation in the number of candidates for the operation according to an embodiment of the disclosure may refer, for example, to a degree of change, during a unit time, in the number of candidates for the operation that may be determined in accordance with information input to the electronic device 1000 in real time.

For example, when information suitable for determining the detailed content of the operation is received from the user during the unit time, the variation in the number of candidates for the operation to be determined according to the user input may be determined as a relatively large value. The electronic device 1000 may determine that the information received from the user during the unit time is appropriate and guide the user to continuously provide the appropriate information as in the current state via the feedback information 120.

On the other hand, when the information received from the user during the unit time is not suitable for determining the detailed content of the operation or is substantially or actually the same as the previously received information, the variation in the number of candidates for the operation to be determined according to the user input may be measured as a relatively small value The electronic device 1000 may determine that the information received from the user during the unit time is insufficient and guide the user to provide information appropriate for determining the detailed content of the operation via the feedback information 120.

The number of candidates for the operation described above may be obtained as a result of searching through the database according to the determined detailed content of the operation based on currently collected information. For example, when the user's intention is an "order for pork" and the detailed content of the operation includes "pork belly" and "price range around 10,000 won", operations corresponding to the information may be found as a result of searching through the database based on the information and the number of found operations may be obtained as the number of candidates for the operation.

Thus, the electronic device 1000 may transmit information indicating whether the information currently received from the user is suitable for determining the detailed content of the operation corresponding to the user's intention, to the user by providing the feedback information 120 according to an embodiment of the disclosure to the user.

According to an embodiment of the disclosure, the system for providing the feedback information 120 for the input 111 of the user 110 may further include a server (not shown) in addition to the electronic device 1000.

The server (not shown) may be implemented using at least one computer device. The server (not shown) may be distributed in a cloud form and may provide a command, a code, a file, a content, or the like.

The server (not shown) may perform operations executable by the electronic device 1000. For example, the server (not shown) may generate the feedback information 120 based on an input signal of the user received from the electronic device 1000 and transmit the generated feedback information 120 to the electronic device 1000. Also, the server (not shown) may perform the operation (e.g., "order for pork") 140 based on the information input by the user and received from the electronic device 1000 and generate a result of the operation 140.

Figure 2:
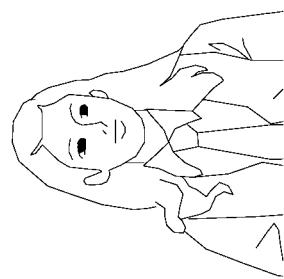
FIG. 2 is a diagram illustrating an example of providing feedback information in response to a user input, according to an embodiment of the disclosure.

FIG. 2 is a diagram illustrating an example of providing feedback information in response to a user input according to an embodiment of the disclosure.

Referring to FIG. 2, the user 110 may transmit inputs 211, 213, 215, 217, and 219 illustrated in FIG. 2 to the electronic device 1000 via a conversational interface.

The electronic device 1000 may determine the user's intention based on the inputs 211, 213, 215, 217, and 219 received from the user and perform an operation corresponding to the determined user's intention. In addition, the electronic device 1000 may guide the user to provide appropriate information to the electronic device 1000 by providing the user with feedback information including a variation in the number of candidates for the operation to be determined based on currently received inputs of the user.

Upon receiving the input 211 from the user, the electronic device 1000 may determine that a user input is received and output an orange light 222 as feedback information indicating that the electronic device 1000 is in a standby state waiting for additional input of the user.

The electronic device 1000 may determine the user's intention from the input 211 received from the user 110 and obtain information for determining the operation corresponding to the intention. For example, the electronic device 1000 may determine "order for a product" as the user's intention and obtain "pork", "for one serving (300 g)", and "packed" as information for determining the operation corresponding to the user's intention.

Also, the electronic device 1000 may further receive the input 213 from the user 110 after the input 211. Based on the input 213, the electronic device 1000 may obtain "for fried rice" and "product similar to previously bought one" as information for determining the operation corresponding to the intention. The electronic device 1000 may output a green light 224 as feedback information because information significant for determining the detailed content of the operation is obtained based on the input 213. The green light 224 may indicate that the input 213 currently received from the user 110 includes information suitable for determining the detailed content of the operation.

The electronic device 1000 may receive the input 215 from the user 110 after the input 213. The electronic device 1000 may obtain "pork" as information for determining the operation corresponding to the intention from the input 215. However, because information obtained from the input 215 overlaps the previously obtained information, the input 215 is not significant information for determining the detailed content of the operation. Thus, the variation in the number of candidates for the operation to be determined by the electronic device 1000 decreases, and accordingly the electronic device 1000 may output a red light 226 as feedback information indicating that the currently input information is not helpful in determining the detailed content of the operation.

The electronic device 1000 may receive the input 217 from the user 110 after the input 215. Because the input 217 does not include information significant for determining the detailed content of the operation, either, the variation in the number of candidates for the operation to be determined by the electronic device 1000 is still in a low state.

When the variation lower than a reference value is maintained for a predetermined time or longer, the electronic device 1000 may ask (228) the user for additional information significant for determining the detailed content of the operation. For example, the electronic device 1000 may directly ask the user for a type of pork to be ordered as information capable of reducing the number of candidates for the operation to be determined.

The electronic device 1000 may obtain "hangjeongsal (pork neck)" as additional information significant for determining the detailed content of the operation from a response that corresponds to the input 219 to the asking 228.

According to an embodiment of the disclosure, the information "pork neck" is obtained. When accuracy of the operation to be determined to correspond to the user's intention is equal to or greater than a reference value, the electronic device 1000 may determine the operation corresponding to the user's intention based on the currently collected information. For example, the electronic device 1000 may perform an operation 229 of "ordering online at market B for pork neck for fried rice packed for one serving available at price A", determined in accordance with the information currently collected from the user.

Figure 3:
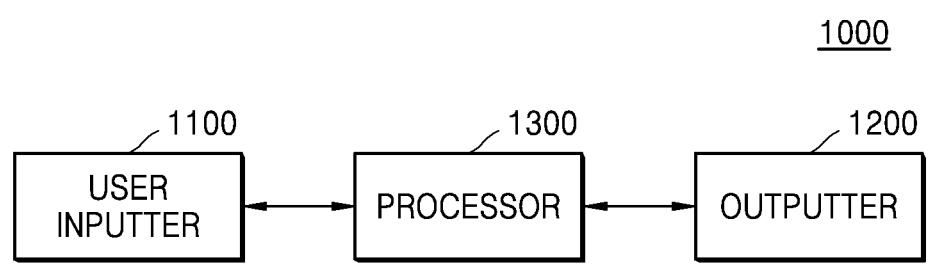
FIG. 3 is block diagram illustrating an example configuration of an electronic device according to an embodiment of the disclosure.

FIG. 3 is block diagram illustrating an example configuration of the electronic device 1000 according to an embodiment of the disclosure.

Figure 4:
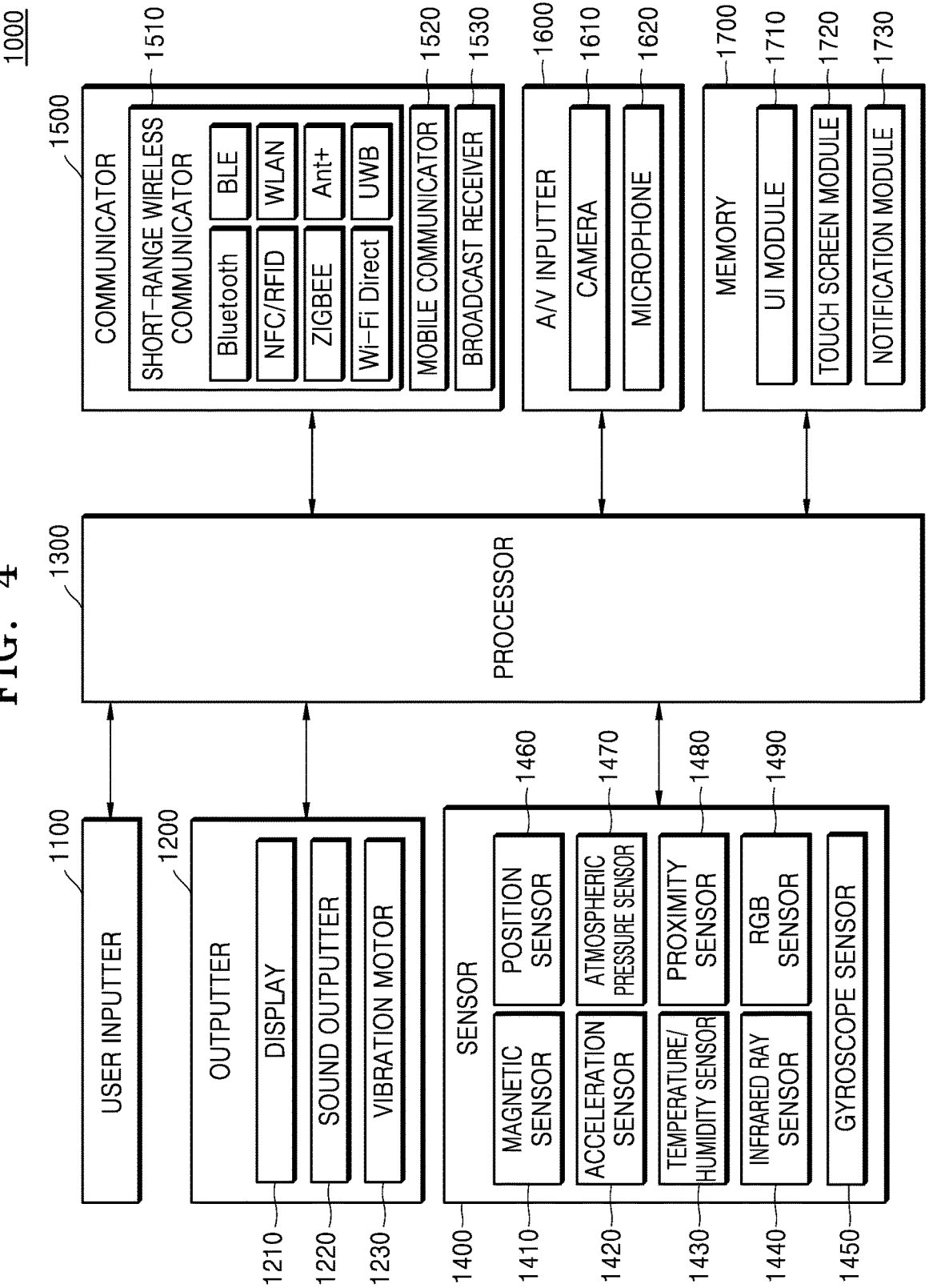
FIG. 4 is block diagram illustrating an example configuration of an electronic device according to an embodiment of the disclosure.

FIG. 4 is block diagram illustrating an example configuration of the electronic device 1000 according to an embodiment of the disclosure.

Referring to FIG. 3, the electronic device 1000 may include a user inputter (e.g., including input circuitry) 1100, a processor (e.g., including processing circuitry) 1300, and an outputter (e.g., including output circuitry) 1200. However, all of the components shown in FIG. 3 are not essential components of the electronic device 1000. The electronic device 1000 may be implemented using more components than those shown in FIG. 3. Alternatively, the electronic device 1000 may be implemented using less components that those shown in FIG. 3.

For example, the electronic device 1000 according to an embodiment of the disclosure may further include a sensor 1400, a communicator (e.g., including communication circuitry) 1500, an audio/video (A/V) inputter (e.g., including A/V input circuitry) 1600, and a memory 1700 in addition to the user inputter 1100, the processor 1300, and the outputter 1200 as shown in FIG. 4.

The user inputter 1100 may include various input circuitry and may refer, for example, to a device through which the user inputs data to control the electronic device 1000. For example, the user inputter 1100 may include various input circuitry, such as, for example, and without limitation, a key pad, a dome switch, a touch pad (e.g., a touch capacitive type touch pad, a pressure resistive type touch pad, an infrared beam sensing type touch pad, a surface acoustic wave type touch pad, an integral strain gauge type touch pad, and a piezo electric type touch pad), a jog wheel, a jog switch, or the like.

According to an embodiment of the disclosure, the user inputter 1100 may receive the input of the user (e.g., a speech input or a text input) via a conversational interface.

The outputter 1200 may include various output circuitry and output an audio signal, a video signal, a vibration signal, or the like, but is not limited thereto. The outputter 1200 may include various output circuitry including, for example, and without limitation, a display 1210, an sound outputter 1220, a vibration motor 1230, or the like.

The display 1210 may output information processed by the electronic device 1000. According to an embodiment of the disclosure, the display 1210 may output feedback information in response to the user input. The display 1210 according to an embodiment of the disclosure may include, for example, and without limitation, a light-emitting diode (LED) device capable of outputting a light indicating the feedback information.

When the display 1210 and the touch pad comprise a touch screen in a layered structure, the display 1210 may also be used as an input device as well as an output device. The display 1210 may include, for example, and without limitation, at least one of a liquid crystal display, a thin film transistor-liquid crystal display, an organic light-emitting diode, a flexible display, a 3D display, an electrophoretic display, or the like. Also, the electronic device 1000 may include two or more displays 1210 according to implementations of the electronic device 1000.

The sound outputter 1220 may include various sound output circuitry and outputs audio data received from the communicator 1500 or stored in the memory 1700. According to an embodiment of the disclosure, the sound outputter 1220 may output a string of characters indicating the result of performing the operation according to the input of the user as a synthetic sound. For example, the sound outputter 1220 may output a string of characters asking the user for information for determining the detailed content of the operation in accordance with the intention determined by the input of the user as a synthetic sound. Also, the sound outputter 1220 may output a string of characters indicating the detailed content of the operation determined in accordance with the user's intention as a synthetic sound. The sound outputter 1220 may also output a string of characters indicating the result of the operation determined and performed in accordance with the user's intention as a synthetic sound.

The vibration motor 1230 may output a vibration signal. In addition, the vibration motor 1230 may output a vibration signal when a touch is input onto the touch screen. According to an embodiment of the disclosure, the vibration motor 1230 may output a vibration signal indicating feedback information in response to the user input.

In general, the processor 1300 may include various processing circuitry and may be configured to control the overall operation of the electronic device 1000. For example, the processor 1300 may be configured to control the overall operation of the user inputter 1100, the outputter 1200, the sensor 1400, the communicator 1500, and the A/V inputter 1600 by executing programs stored in the memory 1700. The electronic device 1000 may include at least one processor 1300.

The processor 1300 may be configured to process commands of a computer program by performing basic arithmetic, logic, and input/output calculations. The commands may be provided to the processor 1300 from the memory 1700 or may be received by the communicator 1500 and provided to the processor 1300. For example, the processor 1300 may be configured to execute commands in accordance with program codes stored in a recording medium such as a memory.

The processor 1300 according to an embodiment of the disclosure may determine or control the electronic device 1000 to determine the user's intention and measure a variation in the number of candidates for the operation to be determined to correspond to the user's intention based on information input via the user inputter 1100. In addition, the processor 1300 may guide the user to provide additional information for determining the detailed content of the operation corresponding to the user's intention to the electronic device 1000 by providing the user with feedback information generated based on the variation.

The sensor 1400 may detect a state of the electronic device 1000 and an ambient state of the electronic device 1000 and transmit obtained information to the processor 1300.

The sensor 1400 may include, for example, and without limitation, at least one selected from a magnetic sensor 1410, an acceleration sensor 1420, a temperature/humidity sensor 1430, an infrared ray sensor 1440, a gyroscope sensor 1450, a position sensor (e.g., global positioning system (GPS)) 1460, an atmospheric pressure sensor 1470, a proximity sensor 1480, and a red, green, and blue (RGB) sensor (illuminance sensor) 1490, without being limited thereto.

The communicator 1500 may further include various communication circuitry enabling communications between the electronic device 1000 and a server 2000 or an external device (not shown). For example, the communicator 1500 may include various components, each including various communication circuitry, such as, for example, and without limitation, a short-range wireless communicator 1510, a mobile communicator 1520, and a broadcasting receiver 1530.

The short-range wireless communicator 1510 may include, various components, each including various communication circuitry, such as, for example, and without limitation, a Bluetooth communicator, a Bluetooth Low Energy (BLE) communicator, a near field communicator (NFC/RFID), a wireless local area network (WLAN) or Wi-Fi communicator, a Zigbee communicator, an infrared data association (IrDA) communicator (not shown), a Wi-Fi Direct (WFD) communicator, a ultra-wideband (UWB) communicator, and an Ant+ communicator.

The mobile communicator 1520 may transceive wireless signals to and from at least one of a base station, an external terminal, or a server on a mobile communication network. In this regard, the wireless signals may include various types of data for transceiving audio call signals, video communication call signals, or text/multimedia message.

The broadcasting receiver 1530 may receive broadcasting signals and/or information related to broadcasting from the outside via broadcasting channels. The broadcasting channels may include satellite channels and terrestrial channels. According to an embodiment of the disclosure, the electronic device 1000 may not include the broadcasting receiver 1530.

The communicator according to an embodiment of the disclosure may receive a result of the performed operation from the server (not shown).

The A/V input unit 1600 may include various A/V input circuitry and is configured to input audio signals or video signals and may include a camera 1610 and a microphone 1620. The camera 1610 may obtain image frames of a still image or a moving image via an image sensor in a video call mode or an image capturing mode. An image captured by the image sensor may be processed by the processor 1300 or a separate image processor (not shown).

The microphone 1620 may receive audio signals from the outside and process the received signals into electrical sound data. For example, the microphone 1620 may receive a speech input of the user.

The memory 1700 may store programs for processing and controlling of the processor 1300 and store data input to or output from the electronic device 1000. The memory 1700 according to an embodiment of the disclosure may store information needed to determine the user's intention and information needed to determine the operation corresponding to the user's intention.

The memory 1700 may include at least one type of storage medium selected from a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk.

Programs stored in the memory 1700 may be categorized into a plurality of modules according to functions thereof, e.g., a user interface (UI) module 1710, a touch screen module 1720, and a notification module 1730.

The UI module 1710 may provide a specialized UI or a graphical user interface (GUI) interworking with the electronic device 1000 according to applications. The touch screen module 1720 may detect a touch gesture of the user on a touch screen and transmit information about the touch gesture to the processor 1300. The touch screen module 1720 according to an embodiment of the disclosure may recognize and analyze a touch code. The touch screen module 1720 may be configured as a separate hardware component including a controller.

Various sensors may be provided in or near the touch screen to detect a touch on the touch screen or a proximity touch. A tactile sensor may be an example of the sensor for detecting a touch on the touch screen. A tactile sensor is a sensor configured to detect a touch of an object with a human's tactile ability or more. The tactile sensor may obtain various information such as roughness of a contact surface, rigidity of a contact object, and temperature of a contact point.

The touch gesture of the user may include tap, touch-and-hold, double tap, drag, pan, flick, drag-and-drop, swipe, and the like.

The notification module 1730 may generate a signal for notifying occurrence of an event of the electronic device 1000.

FIG. 5 is a flowchart illustrating an example method of outputting feedback information to a user input, according to an embodiment of the disclosure.

Referring to FIG. 5, in operation 510, the electronic device 1000 may determine a user's intention. According to an embodiment of the disclosure, the users intention may be determined based on information input by the user, but is not limited thereto, and the user's intention may also be determined according to various methods based on various information about the user, such as information about an environment surrounding the user and information about a history of user's commands.

In operation 520, the electronic device 1000 may determine the variation in the number of candidates for the operation that may be determined to correspond to the user's intention based on information input by the user. In operation 530, the electronic device 1000 may generate feedback information based on the variation determined in operation 520. In operation 540, the electronic device 1000 may provide the generated feedback information to the user.

According to an embodiment of the disclosure, the detailed content of the operation corresponding to the user's intention may be determined based on information input by the user. When the detailed content of the operation is determined, at least one candidate for the operation corresponding to the user's intention may be determined.

The electronic device 1000 may determine an operation to be performed by the electronic device 1000 among the one or more candidates for the operation. For example, the operation to be performed by the electronic device 1000 may be determined among the one or more candidates for the operation based on information about the user such as the history of user's commands or user's preference information. As another example, the operation to be performed by the electronic device 1000 may be determined among the one or more candidates for the operation according to the input of the user. However, the embodiment of the disclosure is not limited thereto, and the operation to be performed by the electronic device 1000 may also be determined among the one or more candidates for the operation according to various methods.

As the number of the candidates for the operation decreases, the probability of being determined as the operation intended by the user may increase. Thus, the electronic device 1000 according to an embodiment of the disclosure may guide the input of the user such that the number of candidates for the operation to be determined decreases. For example, the electronic device 1000 according to an embodiment of the disclosure may guide the input of the user such that the number of candidates for the operation to be determined decreases, by providing feedback information to the user.

According to an embodiment of the disclosure, the variation in the number of candidates for the operation to be determined to correspond to the user's intention may indicate whether information received from the user during a current unit time is sufficient for determining the detailed content of the operation. For example, when information suitable for determining the detailed content of the operation is provided during the unit time, the number of candidates for the operation to be determined to correspond to the user's intention may relatively rapidly decrease, and thus the variation may be measured as a large value. On the other hand, when information insufficient or unhelpful for determining the detailed content of the operation is provided during the unit time, the number of candidates for the operation may relatively slowly decrease, and thus the variation may be measured as a small value.

Thus, the electronic device 1000 according to an embodiment of the disclosure may provide the feedback information 120 based on the variation in the number of candidates for the operation to be determined to correspond to the user's intention and guide the user to provide intention suitable for determining the detailed content of the operation via the feedback information 120

FIG. 6 is a diagram illustrating an example of providing feedback information in response to a user input according to an embodiment of the disclosure.

Referring to FIG. 6, the user 110 may transmit inputs 610, 640, 660, and 680 illustrated in FIG. 6 to the electronic device 1000 through a conversational interface.

Unlike the example illustrated in FIG. 2, according to the example shown in FIG. 6, the variation in the number of candidates for the operation to be determined to correspond to the user's intention may be measured using slot information including information regarding characteristics of information for determining the operation corresponding to the intention.

The electronic device 1000 may determine the user's intention and perform an operation determined to correspond to the intention based on the inputs 610, 640, 660, and 680 received from the user. In addition, the electronic device 1000 may guide the user to provide appropriate information to the electronic device 1000 by providing the user with feedback information including the variation in the number of candidates for the operation to be determined based on a currently received input of the user.

Upon receiving the input 610 from the user, the electronic device 1000 may detect the received user input and output an orange light 620 as feedback information indicating that the electronic device 1000 is in a standby state waiting for an additional input of the user.

The electronic device 1000 determines the user's intention from the input 610 received from the user 110 and obtain information for determining the operation corresponding to the intention. For example, the electronic device 1000 may determine a "purchase of beef" as the user's intention.

According to an embodiment of the disclosure, when information for determining the user's intention is referred to as first information, the first information may be obtained based on various information about the user such as information input by the user and information about an environment surrounding the user.

The user's intention may be newly determined at every different time point according to the first information obtainable in real time or a plurality of intentions may be determined simultaneously. For example, a new intention different from a previously determined intention may be determined in accordance with the first information newly obtained with the lapse of time, and the electronic device 1000 may determine an operation in accordance with the newly determined intention. In addition, the electronic device 1000 may determine one or more operations respectively corresponding to the determined one or more intentions of the user.

The electronic device 1000 according to an embodiment of the disclosure may determine slot information corresponding to the determined intention. The slot information may include information regarding characteristics of information for determining the operation corresponding to the intention. For example, the slot information may be included in a form of type of meat, part of meat, weight, manufacturer, price, and country of origin, as shown in FIG. 6 and information included in each slot, e.g., the type of meat, the part of meat, the weight, the manufacturer, the price, and the country of origin, may indicate a characteristic of information for determining the operation.

The slot information according to an embodiment of the disclosure may be pre-stored in the memory 1700 to correspond to one or more intentions. Also, the slot information may be modified and refined in real time based on information learned based on the history of user's commands. For example, the slot information may be modified and refined in real time based on information learned for each user to be most suitable for determining the operation corresponding to the intention.

The electronic device 1000 may obtain "beef", "300 g", and "seaweed soup" as second information for determining the operation corresponding to the intention. The second information may refer, for example, to keyword information obtained from information input by the user.

The electronic device 1000 according to an embodiment of the disclosure may obtain third information from the second information based on slot information. The third information may refer to information obtained from the second information based on slot information as information for determining the operation corresponding to the intention. For example, the third information in the form of beef, for soup, 300 g, _____, _____, and _____ may be obtained by applying the second information, e.g., "beef", "300 g", and "seaweed soup" to the slot information, e.g., type of meat, part of meat, weight, manufacturer, price, and country of origin.

According to an embodiment of the disclosure, the electronic device 1000 may obtain one or more operations as candidates for the operation corresponding to the third information by retrieving information from the database using the obtained third information.

The electronic device 1000 may fill empty slots indicated by "_____" of the third information by continuously collecting the second information input by the user. The more the slots are filled, the less the number of candidates for the operation corresponding to the intention will be. For example, as the number of the filled slots increases, conditions for searching through the database are added, resulting in a decrease in the number of candidates for the operation to be determined.

When pieces of the information to fill the empty slots are inconsistent with each other, the electronic device 1000 may determine the pieces of the information to fill the empty slots based on various information about the user such as information about whether accuracy of the operation to be determined according to the third information is out of an ideal value, a history of user's commands, and user preference information.

For example, "lamb" that is inconsistent with "beef" is collected as the second information together with "beef", the electronic device 1000 needs to select one of the "beef" and "lamb" because both correspond to the same category "type of meat" in the slot information. When the electronic device 1000 applies "lamb" to a slot of the third information instead of the "beef" and searches for through the database, "lamb" for soup may not found in the database. In this case, the number of candidates for the operation found in the database may rapidly decrease. Also, the electronic device 1000 may determine that there is a very low possibility that the user makes a soup with lamb based on various information about the user such as a purchase history of the user and user preference information.

Thus, the electronic device 1000 may determine the "lamb" is inappropriate information that does not correspond to the user's intention and may apply "beef" to the slot of the third information instead of the "lamb". However, the embodiment of the disclosure is not limited to the above-described example, and the electronic device 1000 may obtain third information by determining pieces of the second information to be applied to the slots of the third information using various methods.

The electronic device 1000 may output a green light 630 as feedback information because information significant for determining the detailed content of the operation is obtained based on the input 610. The green light 630 may indicate that the input 610 currently received from the user 110 includes information suitable for determining the detailed content of the operation.

The electronic device 1000 may further receive the input 640 from the user 110 after the input 610. The electronic device 1000 may obtain "for soup" and "for one serving" as second information by the input 640. For example, the third information in the form of beef, for soup, 300 g, _____, _____, and _____ may be obtained by applying the second information, e.g., "for soup" and "for one serving" to the slot information, e.g., type of meat, part of meat, weight, manufacturer, price, and country of origin. However, third information obtained from the input 640 is the same as the previously obtained third information, and thus the input 640 does not provide information significant for determining the detailed content of the operation. Thus, because the variation in the number of candidates for the operation to be determined by the electronic device 1000 decreases, the electronic device 1000 may output a red light 650 as feedback information indicating that the currently input information is not helpful in determining the detailed content of the operation.

The user 110 may recognize that information significant for determining the detailed content of the operation needs to be provided to the electronic device 1000 based on the red light 650, as feedback information of the electronic device 1000, and respond thereto by providing the input 660 or the like.

The electronic device 1000 may directly ask a question 670 to the user about additional information significant for determining the detailed content of the operation when the variation lower than a reference value is maintained for a predetermined time or longer. For example, the electronic device 1000 may directly ask the user for a price range of beef to be ordered as information capable of reducing the number of candidates for the operation to be determined.

The electronic device 1000 may obtain "15,000 won" and "domestic product" as additional information significant for determining the detailed content of the operation from an answer that corresponds to the input 680 to the question 670.

According to an embodiment of the disclosure, the electronic device 1000 may obtain information "15,000 won" and "domestic product" from the second information based on the answer 680 of the user and obtain third information, e.g., beef, for soup, 300 g, _____, and about 15,000 won, from the second information.

When accuracy of the operation to be determined to correspond to the user's intention based on the third information is equal to or greater than a reference value, the electronic device 1000 may determine the operation corresponding to the user's intention based on the third information.

The accuracy of the operation to be determined to correspond to the user's intention may be determined in real time according to the number of candidates for the operation to be determined based on third information. For example, when there is a small number of candidates for the operation, the probability of being determined as the operation corresponding to the user's intention is high, and thus the accuracy may be determined as a high value. On the other hand, when there are a large number of candidates for the operation, the probability of being determined as the operation corresponding to the user's intention is low, and thus the accuracy may be determined as a low value.

In addition, the accuracy of the operation to be determined to correspond to the user's intention may also be determined according to a characteristic of information indicated as "_____" that is not determined in the third information as well as the number of candidates for the operation. For example, when the information indicated as "_____" is information that may be automatically determined to correspond to the user's intention with a high probability based on various information about the user such as the history of user's commands or user preference information, the accuracy may be determined as a high value. For example, when the user has ordered domestic "pork" only every time regardless of the price, the electronic device 1000 may determine the country of origin as "domestic product" with a high accuracy even when information about the country of origin is not received from the user for the order for "pork" and the third information does not contain information about the country of origin.

According to an embodiment of the disclosure, the electronic device 1000 may determine the operation to be performed by the electronic device 1000 among the one or more candidates for the operation when the accuracy of the operation is greater than the reference value. For example, the electronic device 1000 may automatically determine an undetermined detailed content of the operation based on the various information about the user such as the history of user's commands or user preference information. For example, when the user prefers to an order for pork at mart A providing higher points at the same price, the electronic device 1000 may determine the operation of ordering pork at mart A even without information about the place of purchase input by the user. The operation to be performed by the electronic device 1000 may be determined among the one or more candidates for the operation in accordance with the detailed content of the operation in which the country of origin is automatically determined. As another example, the operation to be performed by the electronic device 1000 may be determined among the one or more candidates for the operation according to a user input. However, the embodiment of the disclosure is not limited thereto, and the operation to be performed by the electronic device 1000 may also be determined among the one or more candidates for the operation according to various methods.

For example, by automatically determining information indicated by "_____", which has not been determined from the third information, based on various information about the user, the electronic device 1000 may determine an operation 690 of "ordering online at mart A for beef for soup, 300 g, available at price 14,000 won, delivered at 5:00 pm to 7:00 pm" as a final operation to be performed based on information currently collected from the user. According to an embodiment of the disclosure, the electronic device 1000 may provide the user with the detailed content of the final operation 690 to be performed, receive a confirmation for the operation 690, perform the operation 690 and provide the user with a result thereof.

Figure 7:
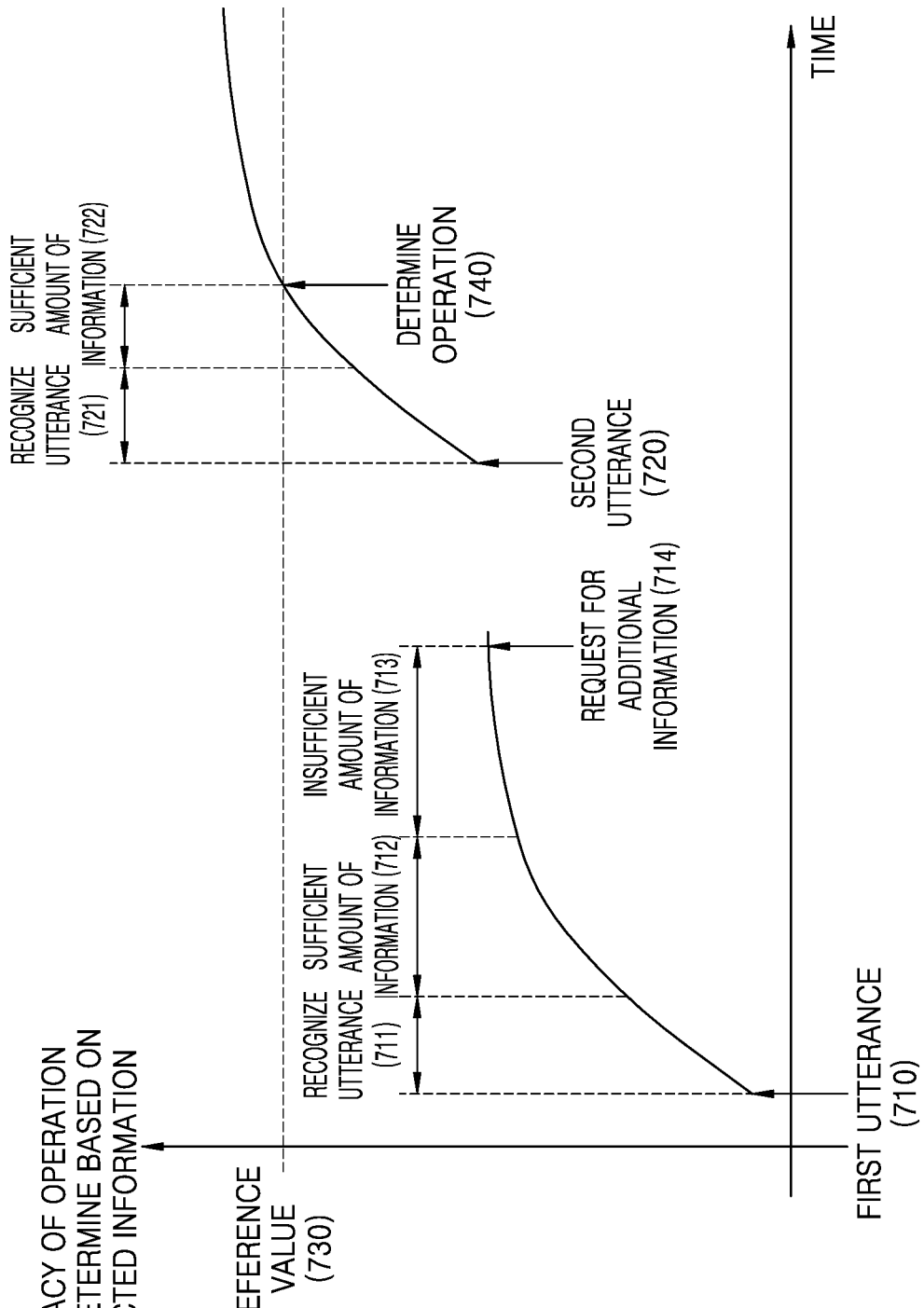
FIG. 7 is a graph illustrating an example of accuracy of an operation to be determined to correspond to a user's intention, according to an embodiment of the disclosure.

FIG. 7 is a graph illustrating an example of accuracy of an operation to be determined to correspond to a user's intention according to an embodiment of the disclosure.

Referring to FIG. 7, an accuracy value of the operation to be determined may vary as shown in FIG. 7 according to information input to the electronic device 1000 by the user over time. The accuracy of the operation to be determined to correspond to the user's intention may be determined in real time according to the number of candidates for the operation to be determined based on an input received from the user.

When the electronic device 1000 receives a first utterance 710 from the user, the electronic device 1000 may recognize the first utterance 710 of the user (711), determine a user's intention, and perform a process of determining an operation corresponding to the user's intention.

An utterance of the user according to an embodiment of the disclosure may refer, for example, to a speech input, but is not limited thereto, and may include various types of input such as a text input via a conversational interface.

In the illustrated example, although the number of candidates for the operation is in inverse proportion to the accuracy of the operation, an absolute value of a variation in the number of candidates for the operation is in proportion to an absolute value of a variation in accuracy of the operation. Thus, as the variation in the number of candidates for the operation increases, a slope of the graph may become steeper. On the other hand, as the variation in the number of candidates for the operation decreases, the slope of the graph may become gentler.

Because information significant for determining the detailed content of the operation is received from the user in the first utterance 710, the electronic device 1000 may determine that the amount of information is sufficient (712) and provide the user with feedback indicating the same. According to an embodiment of the disclosure, the electronic device 1000 may determine whether the amount of information received from the user is sufficient according to the variation in the number of candidates for the operation to be determined based on information received in a given time interval.

For example, when the variation in the number of candidates for the operation to be determined is equal to or greater than the reference value based on information received in the given time interval, the electronic device 1000 may provide the user with feedback information indicating that the amount of information currently being received is sufficient. Also, when the variation in the number of candidates for the operation to be determined is equal to or greater than the reference value based on information received in the given time interval, the electronic device 1000 may maintain the standby state to receive additional information for determining the operation corresponding to the users intention from the user for a given time interval. Also, the electronic device 1000 may provide the user with feedback information indicating that the electronic device 1000 is in the standby state to receive additional information for a given time interval.

Also, when information uttered by the user is misrecognized and searching through the database is unavailable, the electronic device 1000 according to an embodiment of the disclosure may provide the user with feedback information indicating the misrecognition.

For example, when the users intention is "call connection", the electronic device 1000 may obtain "person to call" as slot information corresponding to the user's intention. When a keyword "Material Department" uttered by the user is misrecognized by the electronic device 1000, searching for the keyword through the database is unavailable although the electronic device 1000 performs call connection to "A (name of person)" in the misrecognized department. In this case, the electronic device 1000 may provide the user with feedback information indicating that searching for the information input by the user is unavailable. However, when the electronic device 1000 may independently search for "A" through the database, the electronic device 1000 may finally determine an operation to be performed by asking the user whether the found "A" is "A" of the "Material Department".

When information not helpful in determining the detailed content of the operation is continuously received from the user for a given time period as illustrated in the graph, the electronic device 1000 may determine that the variation in the number of candidates for the operation is less than the reference value, and then determine that the amount of information currently being received is insufficient (713). When the variation in the number of candidates for the operation is less than the reference value, the electronic device 1000 may determine that the utterance of the user is terminated. For example, the electronic device 1000 may recognize a case in which the user repeats the same utterance because the user has nothing to say, does not know what to say, or the like. When the state of insufficient information continues, the electronic device 1000 may determine that the utterance of the user is terminated and directly request the user to input additional information for determining the operation.

For example, when the variation in the number of candidates for the operation is less than the reference value, the electronic device 1000 may determine that the amount of information is insufficient (713) and the utterance of the user is terminated. Because the amount of information currently being received is insufficient, the electronic device 1000 may provide the user with feedback information requesting the user for additional information for determining the operation corresponding to the user's intention for a given time interval.

Also, because the state in which the variation is less than the reference value (730) continues over a given time, the electronic device 1000 may output a message requesting the user for additional information for determining the operation corresponding to the user's intention (714). For example, the electronic device 1000 may directly ask a question to obtain information, which is not filled in slot information and required to reduce the number of candidates for the operation, from the user.

For example, when the user's intention is "request for desk repair", the electronic device 1000 may obtain a department to request and a person to request as slot information corresponding to the user's intention. The electronic device 1000 may automatically determine the department to request is "Material Department" based on information about the content of the user's utterance and the department of the user. However, when information about the "person to request" is not obtained, the electronic device 1000 may directly ask the user to select a person among names "A, B, and C" of the material department who are able to repair the desk and available to take a call based on information retrieved from the database.

The user may input a second utterance (720) to the electronic device 1000 in response to the message of asking for additional information (714) received from the electronic device 1000 and the utterance may be recognized (721).

When information significant for determining the detailed content of the operation is received from the user from the second utterance 720, the electronic device 1000 may determine whether the amount of information currently being received is sufficient (722) and provide the user with feedback information indicating the same.

For example, when the variation in the number of candidates for the operation to be determined is equal to or greater than the reference value based on information received in the given time interval, the electronic device 1000 may provide the user with feedback information indicating that the amount of information currently being received is sufficient. Also, when the variation in the number of candidates for the operation to be determined is equal to or greater than the reference value based on information received in the given time interval, the electronic device 1000 may maintain a standby state waiting for additional information for determining the operation corresponding to the user's intention from the user. Also, the electronic device 1000 may provide the user with feedback information indicating that the electronic device 1000 is in the standby state to receive additional information for a given time interval.

When the accuracy of the operation to be determined to correspond to the user's intention is equal to or greater than a reference value 730, it may be determined that there is a high probability of determining the operation corresponding to the user's intention based on the currently collected information. Thus, the operation corresponding to the user's intention may be determined (740) based on information collected so far when the variation is greater than the reference value 730.

Figure 8:
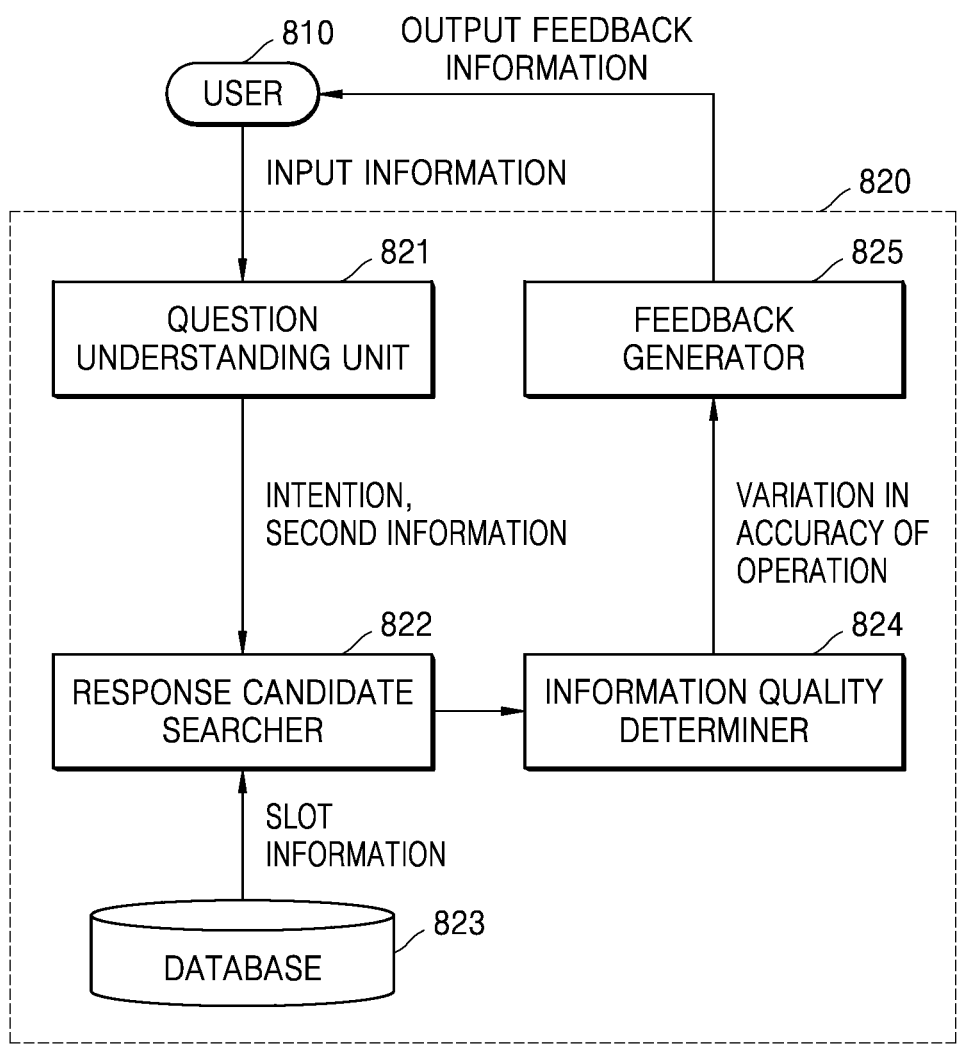
FIG. 8 is a block diagram illustrating an example configuration of an electronic device for providing feedback information in response to a user input, according to an embodiment of the disclosure.

FIG. 8 is a block diagram illustrating an example configuration of the electronic device 1000 providing feedback information in response to a user input according to an embodiment of the disclosure.

The electronic device 1000 may include a question understanding unit (e.g., including processing circuitry and/or executable program elements) 821, a response candidate searcher (e.g., including processing circuitry and/or executable program elements) 822, an information quality determiner (e.g., including processing circuitry and/or executable program elements) 824, and a feedback generator (e.g., including processing circuitry and/or executable program elements) 825 as components to perform a method of providing feedback information in response to the input of the user according to an embodiment the disclosure. An operation of a configuration 820 including the question understanding unit 821, the response candidate searcher 822, the information quality determiner 824, and the feedback generator 825 may be performed in real time.

Referring to FIG. 8, the question understanding unit 821 of the electronic device 1000 may include various processing circuitry and/or executable program elements and obtain text from information input by a user 810 and obtain a user's intention and second information from the text. The second information may refer, for example, to information used to determine an operation corresponding to the user's intention. For example, the second information may include at least one keyword included in the text.

The user's intention and second information obtained by the question understanding unit 821 may be transmitted to the response candidate searcher 822. The response candidate searcher 822 may include various processing circuitry and/or executable program elements and obtain slot information and third information by performing a search through a database 823 using the user's intention and second information. For example, the response candidate searcher 822 may obtain slot information from the database 823 using the user's intention. Also, the response candidate searcher 822 may obtain the third information using the slot information and second information. For example, the response candidate searcher 822 may obtain the third information by applying the second information to the slot information using information stored in the database 823.

Information about operations that may be performed in accordance with the information collected by the electronic device 1000 may be stored in the database 823. For example, order information classified according to the number of grams of pork belly and the country of origin which may actually be ordered from mart A by the electronic device 1000 may be stored in the database 823.

The information quality determiner 824 may include various processing circuitry and/or executable program elements and measure a variation in the number of candidates for an operation to be determined to correspond to the user's intention over time based on the third information obtained by the response candidate searcher 822.

The feedback generator 825 may include various processing circuitry and/or executable program elements and generate feedback information based on the variation in the number of candidates for the operation determined by the information quality determiner 824. For example, when the variation in the number of candidates for the operation is equal to or greater than a reference value, the feedback generator 825 may generate feedback information indicating that the electronic device 1000 is in a standby state waiting for additional information for determining the operation corresponding to the user's intention from the user. Also, when the variation in the number of candidates for the operation is less than the reference value, the feedback generator 825 may generate feedback information asking the user for additional information for determining the operation corresponding to the user's intention by the electronic device 1000.

According to an embodiment of the disclosure, an operation corresponding to the user's intention may be determined with high accuracy by guiding the user to provide information sufficient for determining the operation by providing feedback information in response to a user input.

A machine-readable storage medium may be provided in the form of a non-transitory storage medium. The, "non-transitory" storage medium may not include a signal (e.g., electromagnetic wave) and is tangible, but does not distinguish whether data is permanently or temporarily stored in a storage medium. For example, the "non-transitory storage medium" may include a buffer in which data is temporarily stored.

According to an embodiment of the disclosure, the methods according to various examples disclosed herein may be provided in a computer program product. A computer program product may be traded between a seller and a purchaser as a commodity. A computer program product may be distributed in the form of a machine readable storage medium (e.g., compact disc read only memory (CD-ROM)) or distributed on-line (e.g., download or upload) through an application store (e.g. PlayStore™) or directly between two user devices (e.g., smartphones). In the case of on-line distribution, at least a portion of the computer program product (e.g., downloadable app) may be temporarily stored, or temporarily created, on a storage medium such as a manufacturers server, a server of an application store, or a memory of a relay serve.

Also, throughout the specification, the "unit" may be a hardware component such as a processor or a circuit and/or a software component executed by the hardware such as the processor.

The above description of the disclosure is provided for the purpose of illustration, and it would be understood by those skilled in the art that various changes and modifications may be made without changing technical conception and essential features of the disclosure. Thus, it is clear that the above-described embodiments of the disclosure are illustrative in all aspects and do not limit the disclosure. For example, each component described to be of a single type may be implemented in a distributed manner. Likewise, components described to be distributed may be implemented in a combined manner.

While the disclosure has been illustrated and described with reference to various example embodiments, one of ordinary skill in the art will understand that the example embodiments are intended to be illustrative, not limiting. It shall also be understood that all modifications and embodiments conceived from the meaning and scope of the claims and their equivalents are included in the scope of the disclosure.

What is claimed is:

1. A method, of providing feedback information in response to an input of a user performed by an electronic device, the method comprising:

receiving the input of the user;

determining an intention of the user from the received input of the user;

determining a variation in a number of candidates for an operation to be determined to correspond to the intention based on information currently collected by the received input of the user before determining an operation from the candidates for the operation, wherein the variation in the number of candidates indicates at least a degree of change in the number of candidates during a preset time;

based on the variation being less than a reference value, providing, to the user, first feedback information including information requesting the user for addition information for determining the operation corresponding to the intention; and based on the variation being equal to or greater than the reference value, providing, to the user, second feedback information including information indicating that the electronic device is in a standby state for receiving the addition information.

2. The method of claim 1, wherein the determining of the variation comprises:

obtaining information about at least one characteristic of information corresponding to the intention;

obtaining at least one piece of information having the characteristic from the information currently collected by the received input of the user; and determining the variation based on the obtained at least one piece of information.

3. The method of claim 1, wherein the information currently collected by the received input of the user is obtained based on at least one of text obtained as a result of speech recognition of a speech of the user or text input by the user.

4. An electronic device configured to provide feedback information in response to an input, the electronic device comprising:

an inputter, comprising input circuitry, configured to receive an input of a user;

at least one processor configured to control the electronic device to:

receive the input of the user, determine an intention of the user from the input of the user, determine a variation in a number of candidates for an operation to be determined to correspond to the intention based on information currently collected by the received input of the user, before determining an operation from the candidates for the operation, wherein the variation in the number of candidates indicates at least a degree of change in the number of candidates during a preset time, based on the variation being less than a reference value, provide, to the user, first feedback information including information requesting the user for addition information for determining the operation corresponding to the information, and based on the variation being equal to or greater than the reference value, provide, to the user, second feedback information including information indicating that the electronic device is in a standby state for receiving the addition information.

5. The electronic device of claim 4, wherein the at least one processor is configured to control the electronic device to: obtain information about at least one characteristic of information corresponding to the intention, obtain at least one piece of information having the characteristic from the currently collected information, and determine the variation based on the obtained at least one piece of information.

6. The electronic device of claim 4, wherein the currently collected information includes information based on at least one of text obtained as a result of speech recognition of a speech or text input.

7. A computer program product comprising a non-transitory computer-readable recording medium having recorded thereon a program for executing the method of claim 1.

* * * * *